United States Patent Office 3,547,873
Patented Dec. 15, 1970

3,547,873
COMPOSITIONS OF SATURATED POLYESTERS, INORGANIC SOLIDS, AND POLYFUNCTIONAL EPOXIDES
Klaus Weissermel, Kelkheim, Taunus, Rudolf Uebe, Eschborn, Taunus, Rudolf Kern, Mainz, and Ludwig Brinkmann, Frankfurt am Main, Germany, assignors to Farbwerke Hoechst Aktiengesellschaft vormals Meister Lucius & Bruning, Frankfurt am Main, Germany, a corporation of Germany
No Drawing. Filed Apr. 18, 1969, Ser. No. 817,555
Claims priority, application Germany, Apr. 24, 1968, 1,769,230
Int. Cl. C08g 51/04
U.S. Cl. 260—40                         16 Claims

ABSTRACT OF THE DISCLOSURE

Molding compositions from linear saturated polyesters, inert inorganic solids and polyfunctional epoxides, which molding compositions may be shaped in the thermoplastic state and from which molded articles can be made which are exempt from flash formation.

---

The present invention relates to thermoplastic molding compositions containing polyesters.

It has been described that under certain conditions polyesters from aromatic dicarboxylic acids and suitable aliphatic diols may also be worked up in the thermoplastic state into molded articles. However, when working up such molding compositions by injection-molding, there occur phenomena which render the rational manufacture of high-quality products difficult, especially flash formation, thermal degradation of the polyester mass in the injection-molding machine and a too low rate of crystallization of the pure polyester material in the mold. Flash formation and thermal degradation cannot be avoided by altering the working conditions of the injection-molding machine. Since, for example, polyethylene glycol terephthalate has a high crystallite melting point, it can be molded in the thermoplastic state only at temperatures above 250° C. In order to fill the molds completely, a corresponding dwell-time is necessary which, however, generally leads to the undesirable flash formation. The molds are heated in order to obtain as rapid and complete a crystallization of the test bodies as possible. Also the addition of auxiliary agents promoting crystallization has proved very useful, which agents may be added to the polyester in the form of finely ground minerals.

It has been described, moreover, to add epoxides of the formula

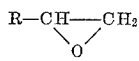

in which R represents an alkyl-, cycloalkyl-, aralkyl- or aryl group containing, optionally, ether groups, said group containing at least one epoxy group, to the polyester molding compositions to improve their utilitarian properties.

Now we have found that a thermoplastic molding composition comprising:

(a) a linear saturated polyester of an aromatic dicarboxylic acid and, optionally, an amount of up to 10% by weight of an aliphatic dicarboxylic acid, with a saturated aliphatic or cycloaliphatic diol, and
(b) from 0.05% by weight to 2% by weight, preferably 0.2% by weight to 1% by weight, calculated on the polyester mass, of polyfunctional epoxides of the formula

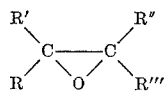

in which at most two of the radicals R, R', R" and R''' represent a hydrogen atom, the remaining radicals represent alkyl-, cycloalkyl-, aryl- or aralkyl groups containing, optionally, ether oxygen, of which groups at least one contains another epoxide grouping corresponding to the above definition, and
(c) from 0.05% by weight to 2% by weight, preferably 0.1% by weight to 0.5% by weight, calculated on the polyester, of inert inorganic solids having a particle size below 5 microns, such as silicates, for example talcum, kaolin, furthermore metal oxides, for example titanium dioxide, antimony oxide, magnesium oxide, the salts of an alkali metal or alkaline earth metal, for example carbonates and fluorides, possesses outstanding properties.

With the use of the polyfunctional epoxides according to the invention, the molded articles remain entirely exempt from flash formation even when higher injection pressures are applied whereas, for example, a polyethylene glycol terephthalate having a relative specific viscosity of 1.38 dl./g., which has been prepared only with an auxiliary agent promoting crystallization, exhibits very pronounced flash formation at a dwell time of 70 atmospheres gage. There is simultaneously obtained an increase of the rate of crystallization. It is possible, therefore, to attain higher processing speeds.

It is especially remarkable, however, that the addition of epoxides compensates the degradation of the polyester mass and that there may even be attained an increase of the relative specific viscosity from, for example, 1.38 dl./g. to 1.50 dl./g. in the injection-molding of molded articles.

Polyethylene glycol terephthalate is preferably used as the linear saturated polyester. However, there may also be used other polyesters, for example polycyclohexane-(1.4)-dimethylol terephthalate. Modified polyethylene glycol terephthalate may also be used which may contain, in addition to units of terephthalic acid, units of one or more other aromatic or aliphatic dicarboxylic acids as basic units, for example isophthalic acid, naphthalene-(2,6)-dicarboxylic acid or adipic acid. There may, furthermore, be used modified polyethylene glycol terephthalates containing, in addition to units of ethylene glycol, units of one or more other aliphatic diols such as, for example, neopentyl glycol or butanediol-(1,4) as alcoholic component. Polyesters from hydroxy-carboxylic acids may also be used. The polyesters advantageously have a reduced specific viscosity within the range of from 0.6 to 2.0 dl./g., preferably 0.9 to 1.6 dl./g. (measured in a 1% solution in a 60:40 by weight mixture of phenol and tetrachloroethane at 25° C). Polyesters having a reduced specific viscosity within the range of from 1.1 to 1.5 dl./g. have proved especially useful.

As inorganic auxiliaries promoting crystallization there may be used talcum, taolin, titanium dioxide, aluminum oxide, calcium carbonate. As polyfunctional epoxides there may be used, for example, 4-isopropenyl-cyclohexane-di-epoxide, 2,4-dimethyl-(2,3), (4,5)-di-epoxide-hexane, 3-methyl-heptadiene-(2,5)-di-epoxide, 1,4-di-isopropenyl-benzene-di-epoxide, 1,4-butanediol-di-[β - methyl-glycidyl]-ether, 1,2 - ethylene-glycol-di[2,3 - epoxicyclohexyl]-ether. There exist, fundamentally, two possibilities of adding the additives to the polycondensation product to attain the aforesaid effects in the injection-molding of molded articles. The auxiliary promoting crystallization may be added as such prior to, during or after the polycondensation. In this manner, uniformly nucleated polyester granules are obtained. Thereafter the epoxide compound is applied, either as such or dissolved in a solvent which is subsequently removed. The polyester mass can now directly be injection-molded into molded articles or the epoxide is incorporated into the polyester mass by renewed regranulation. When proceeding in this manner, step by step, an especially homogeneous distribution of the additives is obtained.

It is also possible to subject the polyester granules to rotation together with the epoxide and the inorganic auxiliary promoting crystallization and to transform the granules by melting in an extruder and subsequent granulation into a form that may be subjected to further processing.

The general working direction is that all operations have to be carried out with the exclusion of moisture to avoid hydrolysis of the polyester and the epoxide compound. The polyester molding composition should preferably contain less than 0.01% by weight of water. When a rapid crystallization in the mold and, thereby a short molding period is to be attained, the mold should be heated to a temperature of at least 100° C. Molding temperatures within the range of from 120° C. to 150° C. are preferred.

The following examples serve to illustrate the invention but they are not intended to limit it thereto:

EXAMPLES

Three charges of 1.5 kg. of polyethylene glycol terephthalate in granular form with 0.4% by weight of talcum, a moisture content of 0.008% by weight and a relative specific viscosity of 1.38 dl./g., were each subjected to rotation at 50° C. during the course of one hour with the following epoxides:

(A) 1,4-butanediol-di-[β-methyl-glycidyl]-ether
(B) 2,4-dimethyl-hexadiene-(2,4)-di-epoxide.

The epoxide compounds (A) and (B) were applied in three different concentrations. The granules which had been coated in this manner were homogenized at a temperature of 275° C. in an extruder (residence time in the cylinder: 1.5 minutes/36 r.p.m. (screw) and (after extrusion, granulated in water. The polyester mass was dried at 180° C. in vacuo and then injection-molded into sheets of dimensions 60 x 60 x 2 mm. Each charge was subjected to the same conditions: cylinder temperature 270°/260°/260°, temperature of the mold 140° C., injection time 15 seconds, injection pressure 140 atmospheres gage, while the dwell time and the residence time in the mold were varied.

The results are combined in the table following hereunder. For the purpose of comparison, the values of the polyester granules are given without epoxide.

in which at most two of the radicals R, R', R" and R'" represent a hydrogen atom, the remaining radicals represent alkyl-, cycloalkyl-, aryl- or aralkyl groups containing, optionally, ether oxygen, of which groups at least one contains another epoxide grouping corresponding to the above definition, and
(c) 0.05% by weight to 2% by weight, calculated on the polyester, of inert inorganic solids having a particle size below 5 microns.

2. A thermoplastic molding composition as claimed in claim 1, wherein the linear saturated polyester is polyethylene glycol terephthalate.

3. A thermoplastic molding composition as claimed in claim 1, wherein the linear saturated polyester is polycyclohexane-(1,4)-dimethylol terephthalate.

4. A thermoplastic molding composition as claimed in claim 1, wherein the linear saturated polyester contains, as acid units, in addition to units of terephthalic acid, units of one or more other aromatic or aliphatic dicarboxylic acids.

5. A thermoplastic molding composition as claimed in claim 4, wherein the linear saturated polyester contains, in addition to units of terephthalic acid, units of one or more other aromatic or aliphatic dicarboxylic acids selected from the group consisting of isophthalic acid, naphthalene-2,6-dicarboxylic acid or adipic acid.

6. A thermoplastic molding composition as claimed in claim 1, wherein the linear saturated polyester contains, in addition to units of ethylene glycol, units of one or more other aliphatic diols.

7. A thermoplastic molding composition as claimed in claim 6, wherein the linear saturated polyester contains, as alcoholic component, in addition to units of ethylene glycol, units of one or more other aliphatic diols selected from the group consisting of neopentyl glycol or butanediol-(1,4).

8. A thermoplastic molding composition as claimed in claim 1, wherein the linear saturated polyester also contains units of hydroxy-carboxylic acids.

9. A thermoplastic molding composition as claimed in claim 1, wherein the linear saturated polyester has a reduced specific viscosity within the range of 0.6 to 2.0 dl./g. (measured in a 1% solution in a 60:40 by weight mixture of phenol and tetrachloroethane at 25° C.).

10. A thermoplastic molding composition as claimed in claim 1, wherein the linear saturated polyester has a reduced specific viscosity within the range of 0.9 to 1.6

TABLE

| Expoxide | Amount percent by weight | Specific viscosity (dl./g.) | | After injection molding | Flash formation at variable dwell-time | |
|---|---|---|---|---|---|---|
| | | Of the basic polyester | After the granules have been coated with A and B, respectively | | Dwell time (atm. gage) | Flash |
| A. 1,4-butane diol-di-[β-methyl-glycidyl]ether | 0.2<br>0.4<br>0.8 | 1.38 | 1.31<br>1.35<br>1.44 | 1.28<br>1.45<br>1.53 | 70, 100, 140,<br>Not exceeding 140 | None none, slight.<br>None. |
| B. 2,4-dimethylhexadiene-(2,4)diepoxide | 0.2<br>0.4<br>0.8 | 1.38 | 1.29<br>1.33<br>1.46 | 1.14<br>1.37<br>1.57 | 70, 100, 140<br>Not exceeding 140 | None, none, slight.<br>None. |
| Pure polyester (without epoxide) | | 1.38 | | 1.08 | 70<br>140 | Existent.<br>Very pronounced. |

We claim:
1. A thermoplastic molding composition which comprises
  (a) a linear saturated polyester of an aromatic dicarboxylic acid and, optionally, an amount of up to 10% by weight of an aliphatic dicarboxylic acid, with a saturated aliphatic or cycloaliphatic diol, and
  (b) from 0.05% by weight to 2% by weight, calculated on the polyester mass, of polyfunctional epoxides of the formula

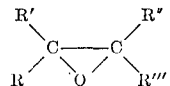

dl./g. (measured in a 1% solution in a 60:40 by weight mixture of phenol and tetrachloroethane at 25° C.).

11. A thermoplastic molding composition as claimed in claim 1, wherein the linear saturated polyester has a reduced specific viscosity within the range of 1.1 to 1.5 dl./g. (measured in a 1% solution in a 60:40 by weight mixture of phenol and tetrachloroethane at 25° C.).

12. A thermoplastic molding composition as claimed in claim 1, wherein, as inorganic solids, compounds selected from the group consisting of talcum, kaolin, titanium dioxide, aluminum oxide and calcium carbonate are applied.

13. A thermoplastic molding composition as claimed in claim 1, wherein the inorganic solids are applied in an amount within the range of from 0.1 to 0.5% by weight, calculated on the polyester.

14. A thermoplastic molding composition as claimed in claim 1, wherein the polyfunctional epoxies are added in an amount within the range of from 0.2 to 1% by weight, calculated on the polyester.

15. A thermoplastic molding composition as claimed in claim 1, wherein, as polyfunctional epoxides, there are applied compounds selected from the group consisting of 4-isopropenyl-cyclohexane-di-epoxide, 2,4-dimethyl-(2,3), (4,5) - di-epoxidehexane, 3 - methyl-heptadiene-(2,5)-di-epoxide, 1,4-diisopropenyl-benzene-di-epoxide, 1,4-butane-diol-di[β-methyl-glycidyl]ether, 1,2-ethylene-glycol - di[2,3-epoxi-cyclohexyl]ether.

16. An article prepared from a thermoplastic molding composition as claimed in claim 1.

References Cited

UNITED STATES PATENTS

| | | | |
|---|---|---|---|
| 2,998,408 | 8/1961 | Zoetbrood | 260—75(Ep)UX |
| 3,372,143 | 3/1968 | Terada et al. | 260—75(Ep)X |
| 3,402,141 | 9/1968 | Matthies et al. | 260—40 |
| 3,479,318 | 11/1969 | Jackson et al. | 260—40 |

FOREIGN PATENTS

| | | | |
|---|---|---|---|
| 954,110 | 4/1964 | Great Britain | 260—835 |

MORRIS LIEBMAN, Primary Examiner

L. T. JACOBS, Assistant Examiner

U.S. Cl. X.R.

260—75